United States Patent

Perry

[11] Patent Number: 5,325,155
[45] Date of Patent: Jun. 28, 1994

[54] CONTROLLING THE SPEED OF AN IMAGE-BEARING MEMBER USING RELATIVE STATES

[75] Inventor: Stuart D. Perry, Rochester, N.Y.

[73] Assignee: Eastman Kodak Company, Rochester, N.Y.

[21] Appl. No.: 58,921

[22] Filed: May 6, 1993

[51] Int. Cl.⁵ .................................. G03G 15/00
[52] U.S. Cl. ......................... 355/208; 198/502.3; 355/210
[58] Field of Search .................. 355/208, 233–235, 355/326, 327, 210; 198/502.3, 502.4; 346/138

[56] References Cited

U.S. PATENT DOCUMENTS

| | | | |
|---|---|---|---|
| 4,416,534 | 11/1983 | Kluger | 355/14 |
| 4,519,700 | 5/1985 | Barker et al. | 355/3 |
| 4,541,709 | 9/1985 | Kampschreur | 355/3 |
| 4,629,310 | 12/1986 | Landa et al. | |
| 4,636,697 | 1/1987 | Kunikawa | 318/436 |
| 4,684,240 | 8/1987 | Miller | |
| 4,723,145 | 2/1988 | Takada et al. | 355/3 |
| 4,761,662 | 8/1988 | Yoshimoto et al. | 346/108 |
| 4,933,727 | 6/1990 | Mizuma et al. | 355/327 |
| 4,947,209 | 8/1990 | Maeno et al. | 355/207 X |
| 5,016,056 | 5/1991 | Johnson et al. | 355/279 |
| 5,021,835 | 6/1991 | Johnson | 355/271 |
| 5,040,026 | 8/1991 | Jamzadeh et al. | 355/271 |
| 5,043,771 | 8/1991 | Shibata et al. | 355/317 |
| 5,076,568 | 12/1991 | deJong et al. | 271/275 |
| 5,101,232 | 3/1992 | Evans et al. | 355/208 |
| 5,130,748 | 7/1992 | Tanaka | 355/206 |
| 5,136,332 | 8/1992 | Johnson | 355/202 |
| 5,239,341 | 8/1993 | Ishida et al. | 355/206 |

*Primary Examiner*—R. L. Moses
*Attorney, Agent, or Firm*—Dennis R. Arndt

[57] ABSTRACT

A method and apparatus for controlling the relative states between a rotating load member driven by a motor via a transmission where the velocity and position of the rotating load member are determined and the velocity and position of the motor are determined. The information concerning the velocity and position of the load and motor are used by a controller to generate a torque signal for controlling the velocity and position of the motor such that there is increased relative damping and relative stiffness between the rotating load member and the motor.

5 Claims, 4 Drawing Sheets

CONTROLLING THE SPEED OF AN IMAGE-BEARING MEMBER USING RELATIVE STATES

TECHNICAL FIELD

The invention relates to an image-forming apparatus, such as a copying and/or printing apparatus, and more specifically, to an apparatus for controlling the speed of the image-bearing member by using an encoder or other feedback device at the motor and at the image-bearing member to measure and control their relative states. Relative states in this document is taken to mean the relative velocity between the prime mover (the motor) and the image-bearing member (the load) and/or the relative position between the prime mover and the image-bearing member.

BACKGROUND ART

In an image-forming apparatus wherein an image (latent image) is formed on an image-bearing member such as a drum or belt which is movable along an endless path, it is required that the speed of the movement of the surface of the image-bearing member (also referred to as the "load") is maintained at a predetermined speed. If the surface speed is different from the predetermined speed, or if the surface speed is not uniform, the image formed on the image-bearing member is contracted or expanded, whereby the formed image is distorted.

U.S. Pat. No. 4,761,662 attempts to control the load velocity by sensing and controlling the velocity of the load directly. Use of this mechanism maintains a constant rotational speed of the drum output. This method assumes that mechanical constraints allow placement of a suitable velocity and/or position sensor at the load. Also assumed is that transmission nonlinearities do not result in control instabilities and that the cost of a separate sensor with reasonable resolution is not prohibitive.

The prior art is replete with techniques for controlling the velocity of a belt, where a load is driven through a belt transmission by a servo controlled motor. The velocity of the load is controlled by controlling the velocity of the motor. For example, if a constant velocity is desired from the load, the motor is servo driven at a constant velocity. Because any transmission system has compliance, it will oscillate or "ring" if torques are applied at the load; the motor will also receive a measure of the torque disturbance, but the servo system will substantially eliminate any velocity variation at the motor. It should be noted that the motivation was to provide constant velocity at the load; however, in practice, the compliance of the transmission results in velocity variations at the load.

Unstable surface speeds can result from a deformation of the transmission which transmits the driving force from the motor to the drum. Because the surface speed of the drum is not controlled, but is allowed to change, the sharpness of the image formed on such a surface is degraded.

A potential solution would be to drive the motor based on the velocity of the load. A couple of problems arise; first sensing the load velocity is often much more difficult than sensing the motor velocity due to mechanical constraints. Secondly, nonlinearities in the transmission can cause control instabilities.

U.S. Pat. No. 5,076,568 attempts to eliminate oscillations in an endless belt by introducing a second motor to drive the load motor in such a way that velocity variations of the belt are eliminated.

U.S. Pat. Nos. 4,541,709 and 4,723,145 both refer to methods of minimizing the velocity errors between an image-bearing member and a transfer material-bearing member. Both use a motor for each of the movable members. Neither addresses the effect of compliance in the transmission between either motor and its load. The present invention serves to minimize the effects of this compliance through the use of a single motor and measurement of the relative states between the motor and the image-bearing member.

SUMMARY OF THE INVENTION

The present invention does not need a second motor and velocity variations of the load are eliminated by sensing the load velocity and using that information to control a single motor.

This invention minimizes the settling time of the photoconductive drum electronically, resulting in the formation of an improved image by using an encoder or other feedback device at the drum and the motor so that it is possible to obtain a measure of the relative velocity and position between the motor and the load. This information can then be used to force the relative velocity and the relative position error to zero. This corresponds to the addition of damping and an increase in stiffness to the physical system. Increased stiffness minimizes the initial "wind-up" or oscillation thereby minimizing both the initial and subsequent oscillations. Increased damping lowers the settling time of an oscillation for a given stiffness.

The exact time period or "window" when a sheet is impacted on the transfer drum can usually be predicted accurately in time if it always occurs at the same position on the drum. Accordingly, the circuit controlling relative damping (and/or relative stiffness) need only be operational within a small "window" or time period around the position where these disturbances occur. This effect can be used to advantage to reduce the cost of the circuitry involved. For example, low-cost circuitry would typically have larger voltage drifts than higher-cost circuitry. When the circuitry is not in use, that is anytime except during the predictable "window" described above, the circuitry voltage drifts could be zeroed to remove drift errors.

The present invention provides in a multicolor image-forming apparatus comprising a movable imaging member the periphery of which moves past a series of electrophotographic stations which include charging, exposing and toning stations to create a series of different color toner images and a transfer station for transferring the images in registration to a receiving sheet to create a multicolor toner image, said apparatus including a motor including encoder means for determining both velocity and position of the motor and further including means for providing a first signal incorporating said information. Means are also included for transferring power from said motor to the movable imaging member with encoder means mounted on the movable member to determine both velocity and position of the movable member and providing a second signal incorporating the information. A controller is responsive to the first and second signals to provide a third signal to the motor to reduce to a minimum the positional error signal and/or velocity error signal between the movable member and the motor.

The present invention further provides a method for increasing both the relative damping and/or the relative stiffness between a rotating load member driven by a motor via a transmission, the method comprises the steps of determining the velocity and/or position of the rotating load member and generating a first signal representative of the velocity and/or position of said load member. Determining the velocity and/or position of said motor and generating a second signal representative of the velocity and/or position of the motor and generating a torque signal for controlling the velocity and/or position of said motor in response to the first and second signals.

These and other objects, features and advantages of the present invention will become more apparent upon consideration of the following description of the preferred embodiments of the present invention taken in conjunction with the accompanying drawings.

DESCRIPTION OF THE PREFERRED EMBODIMENTS

Figure 1:
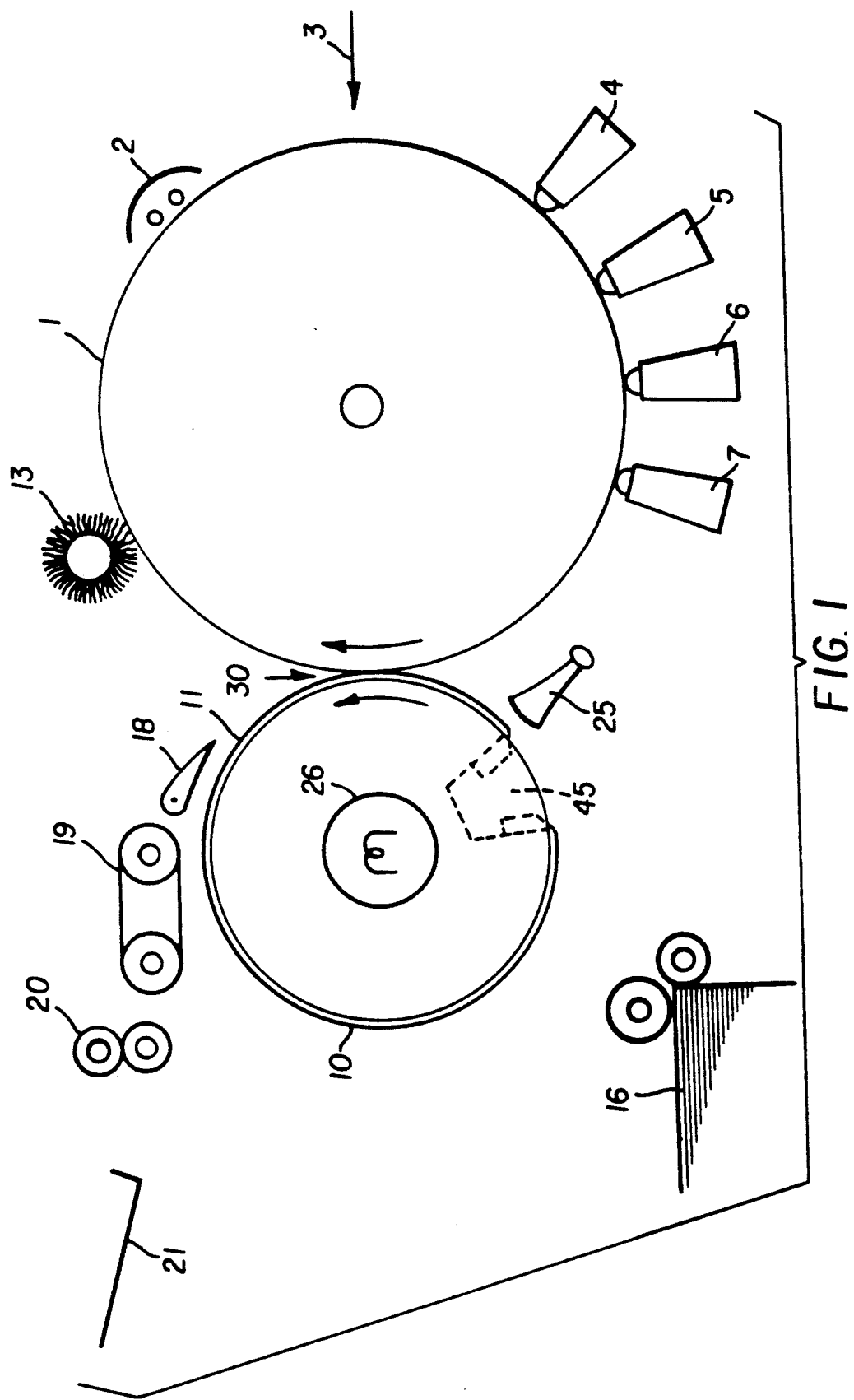
FIG. 1 is a side schematic view of an electrophotographic printer constructed according to the invention.

According to FIG. 1, a conventional multicolor electrophotographic apparatus includes an image member, for example, a photoconductive (PC) drum 1, which is rotatable past a series of stations. The drum 1 is first uniformly charged at a charging station 2, then imagewise exposed at an exposure station 2, for example, laser exposure station 3, to create a series of electrostatic images. The images are toned with toners of different color at toning stations 4, 5, 6 and 7 to create a series of different color images. The color toner images are transferred in registration to a receiving sheet 10 which is carried on the periphery of a transfer roller 11 to form a multicolor image thereon. The periphery of photoconductive drum 1 is then cleaned at a cleaning station 13 for reuse. The receiving sheet 10 has been fed to transfer roller 11 from a sheet supply 16. After the multicolor image has been formed, it is separated from drum 11 by separating means 18 and transported by a transporting device 19 to a fuser 20 and hence to an output tray, all of which is conventional in the art.

Figure 2A:
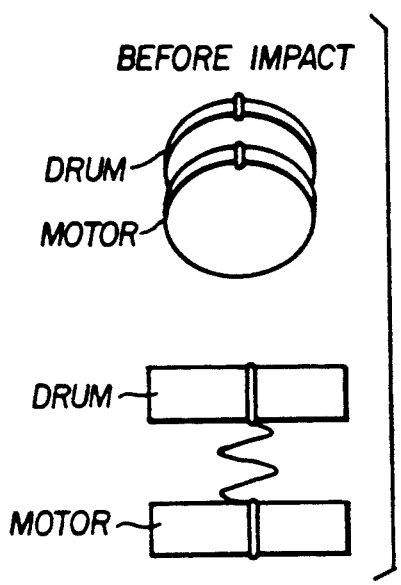
FIGS. 2A and 2B illustrate the effect of drive stiffness on the relative position of motor and drum before (A) and after (B) sheet impact results in an error between the motor and the drum.
Figure 2B:
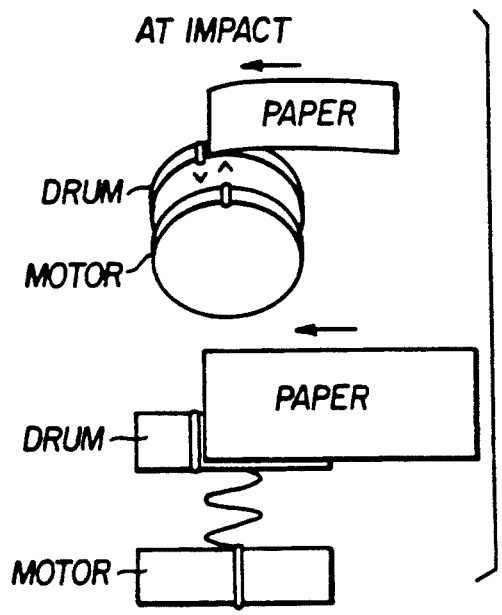

FIGS. 2A and 2B illustrate the effect of drive stiffness on the relative velocity and position of the motor and drum with 2A showing it before impact and 2B showing it after the sheet has impacted.

The drive for the PC drum, that is the mechanical system that connects the motor and the PC drum, was intended to be a very stiff drive that would reduce torque spikes that result from paper impact. After the paper impact occurs, there is a "wind-up" that will release and cause damped oscillations of the drum position and velocity until a steady state is reached. This type of behavior or reaction will result in artifacts on the image. Mechanical stiffening of the drive will ameliorate the problem but, at a certain point, the limit of mechanical stiffness and damping will be reached.

Figure 3:
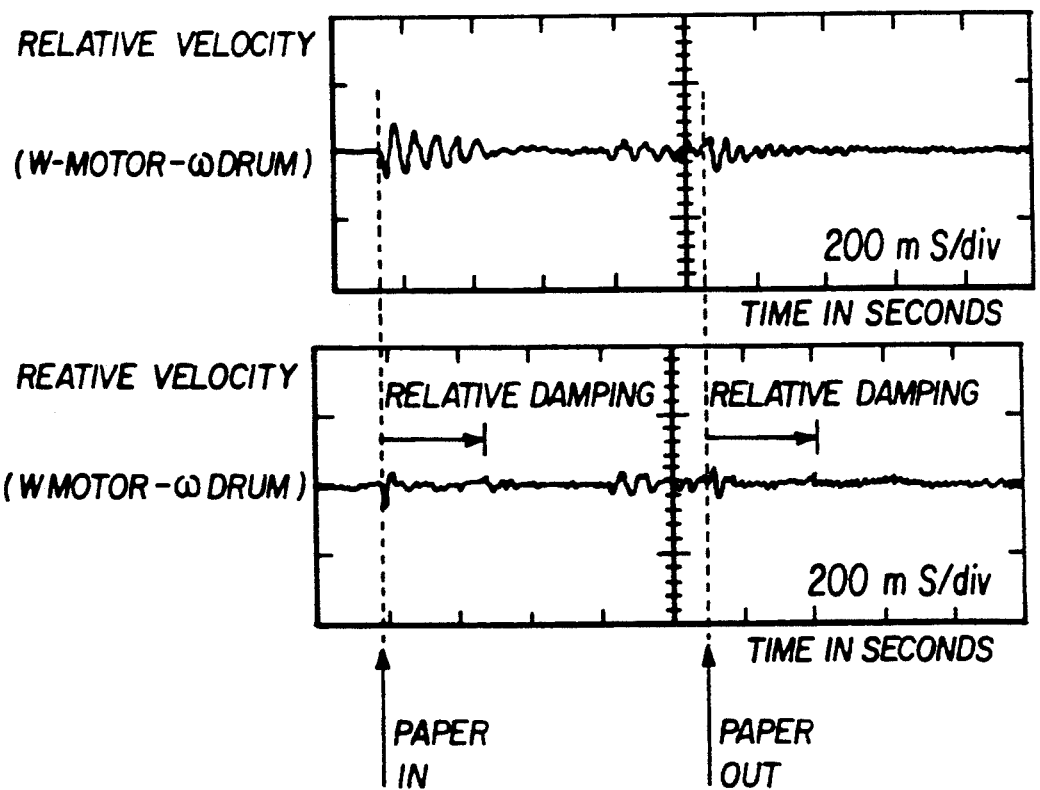
FIG. 3 illustrates in the top trace what happens when no relative damping is used and the paper impact torque results in substantial oscillation on the relative velocity trace and the lower trace illustrates the effect of adding relative damping. It is apparent that the addition of relative damping reduces the settling time of the velocity error ($\omega motor - \omega drum$) in that trace.

FIG. 3 shows a comparison using actual velocity traces from a test using the drive motor and drum system. In this test, the upper trace shows what happens when relative damping is not used; when the paper impact torque occurs, a velocity error is seen on the relative velocity trace. The bottom trace in FIG. 3 shows the beneficial effect of adding relative damping; even though the relative damping is applied for only a portion of the cycle. It is also apparent that the addition of relative damping lowered the settling time of the relative velocity error.

The traces show the relative velocity between the motor and the drum surface; relative damping was set to yield the best damped response. The relative damping torque effect is applied for only the portion indicated on the figure. It should be noted that the relative velocity outside the window of relative damping is almost nonexistent.

Figure 4:
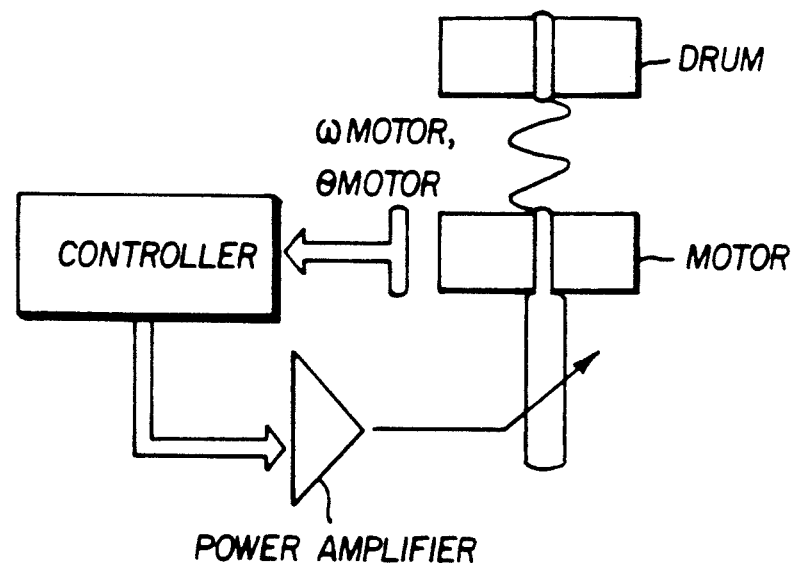
FIG. 4 illustrates a schematic block diagram description of a typical motor velocity controller known in the prior art.

FIG. 4 is a schematic block diagram of a motor velocity controller known in the prior art. A controller of this type senses motor velocity ($\omega$) and motor position ($\theta$). A calculation is performed and the result is applied to a power amplifier which, in turn, drives the motor. In this arrangement, there is no information concerning the status of the drum. It is for this reason that the drum velocity and position will "oscillate" when torque impulses are applied even though the motor velocity will be properly controlled and follows velocity commands from the controller. No effort is made to control the effects of the transmission except for mechanically making the transmission as stiff as possible.

Figure 5:
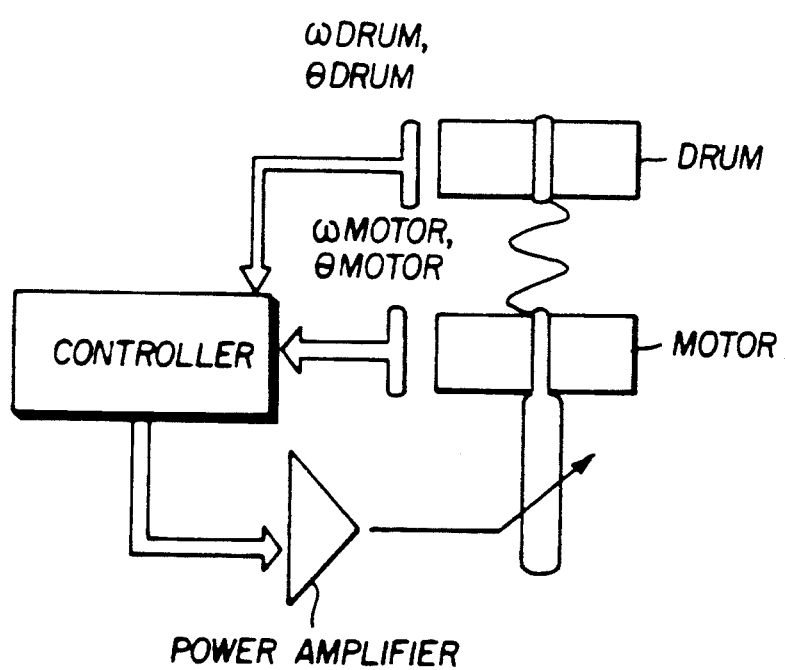
FIG. 5 illustrates a schematic block diagram of a motor velocity controller receiving feedback of the drum's speed or position and similar information from the motor to provide relative damping between motor and drum.

FIG. 5 is a simplified schematic block diagram illustrating a system that provides "relative damping" in accordance with the present invention. Additional measurement devices are provided on the load to give information concerning the velocity and position of the drum so that this information is furnished to the controller as well as velocity and position information of the motor.

The basic mechanical configuration is known as the resonant load system and the solution to the problem is provided by the present invention. In such a system, the load in this embodiment, the PC drum, is connected to its prime mover in this embodiment, a motor, through some type of transmission such as a belt.

The embodiment shown in FIG. 5 minimizes the settling time of the PC drum electronically, thereby allowing for an improved image to be written. By using an encoder or other feedback device at the drum and the motor, it is possible to obtain a measure of the relative velocity and position. This information can then be used to force the relative velocity and/or position error to zero. In physical terms, the forcing of relative velocity and relative position to zero corresponds to the addition of damping and stiffness. An increase in relative stiffness can be used to minimize the magnitude of the initial "wind-up" and also minimize both the initial and subsequent oscillations. An increase in damping lowers the settling time of the oscillations for a given stiffness.

Figure 6:
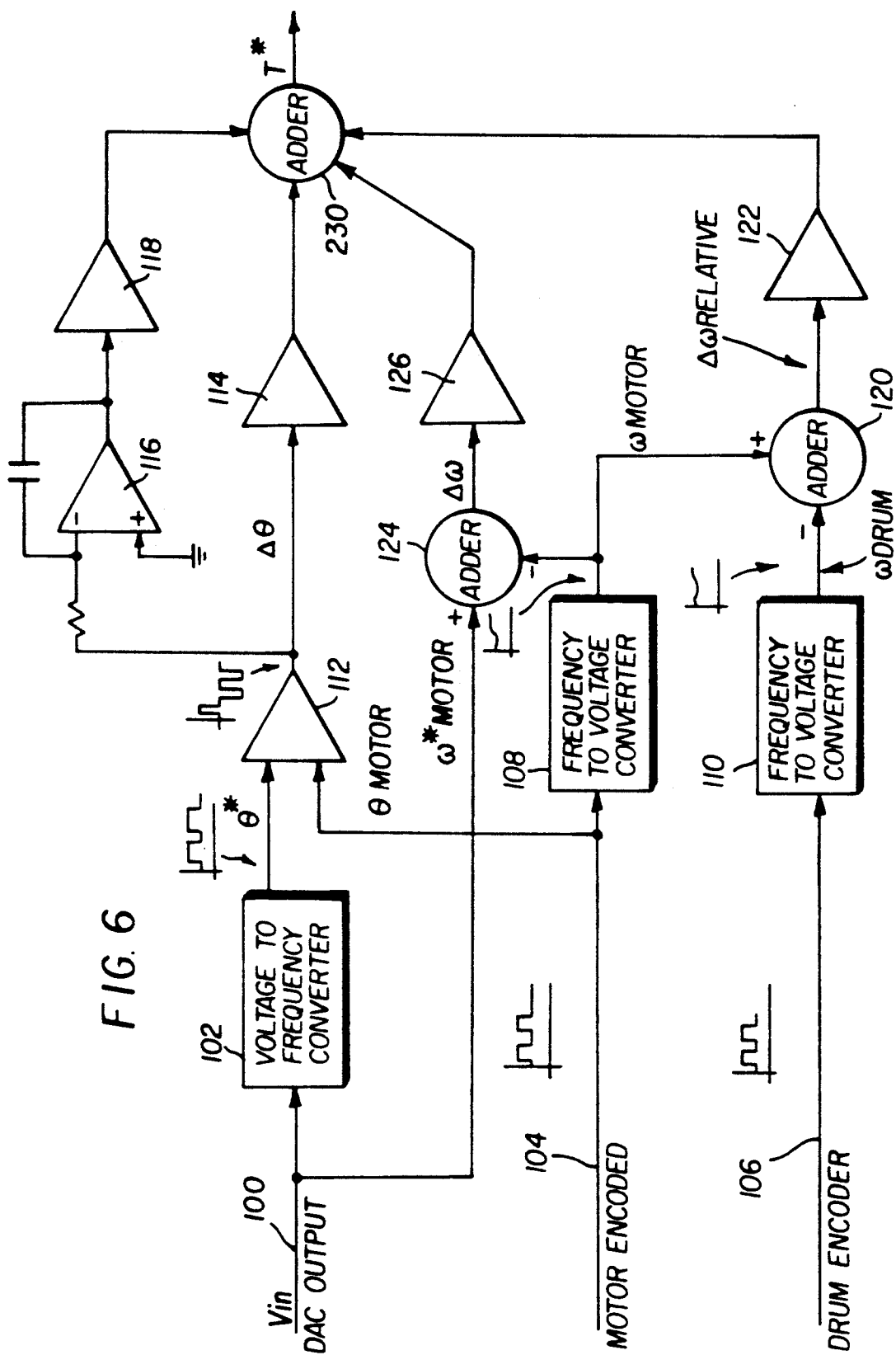
FIG. 6 is a schematic circuit of the controller that receives feedback of both the drum's and motor's velocity and position. This information is used to reduce both velocity and position errors to zero.

FIG. 6 illustrates a block diagram of the circuit implementation of relative damping for the controller shown in FIG. 5. The quantities $\omega^*$motor and $\theta^*$motor are the desired values for the motor velocity and motor position. The quantities $\omega$motor, $\omega$drum, $\theta$motor, $\theta$drum are the measured values for the motor velocity, drum velocity, motor position, and drum position, respectively. The quantities $\Delta\omega$, $\Delta\theta$, and $\Delta\omega$relative are the motor velocity error (the difference between the desired motor velocity, $\omega^*$motor, and the actual motor velocity $\omega$motor), the motor position error, and the relative velocity between the motor and the load, respectively. The quantity T* is the resulting torque command to the motor after the controller completes its calculations.

In this implementation, it was desired to derive the desired values $\omega^*$ and $\theta^*$, from a single analog source, the velocity reference voltage $V_{in}$. In this way, the speed of the motor would be easily changed, and testing of the control system would be straightforward. Inasmuch as this controller was designed to provide for constant velocity, this condition was easily met.

The velocity reference voltage $V_{in}$ appears on line 100 and is derived from a (DAC) digital to analog converter (not shown) and represents the desired velocity, the output of which is directed to a voltage to frequency converter 102 which outputs a square wave the frequency of which varies in accordance with the magnitude of the voltage signal on its input.

The output signal from the motor encoder appears on line 104 with the output signal from the drum encoder appearing on line 106. Each of these signals is fed to a frequency to voltage converter 108 and 110, respectively. The output of each frequency to voltage converter is a signal, the magnitude of which is proportional to the frequency of the signal appearing on their inputs.

The motor encoder signal on line 104 represents the actual position of the motor ($\theta$ motor) and is inputted to a phase frequency detector 112 with the other input receiving a signal representing the desired position ($\theta^*$). The output of the phase frequency detector is $\Delta\theta$ which is a series of pulses, the magnitude and direction of the pulses corresponds to the phase difference of the two signals placed on the input and the sign of the pulses represent the direction (whether leading or lagging) of the error signal $\Delta\theta$. This error signal is amplified by op amp (operational amplifier) 114. The error signal is also sent to integrating op amp 116 with the integrated output signal amplified by op amp 118 having a predetermined gain. The effect of the integrating op amp is to force the position error between the motor and the position reference $\theta^*$ to zero.

The output of frequency to voltage converter 108 represents the actual speed of the motor $\omega$ motor. This signal is combined using adder 120 with the output of frequency to voltage converter 110 which represents the actual speed of the drum ($\omega$drum). The output signal represents the relative difference in velocity between what is actual and what is desired ($\Delta\omega$ relative) between the drum and the motor. The combined signals are sent to op amp 122 for amplification at a predetermined gain.

Similarly, the output of frequency to voltage converter 108 represents the actual velocity of the motor and this signal is combined using adder 124 with the $V_{in}$ signal that represents the desired velocity of the motor. Accordingly, the output of adder 124 represents the difference between the actual velocity of the motor with the desired velocity of the motor ($\Delta\omega$). This signal is amplified by op amp 126 at a known gain.

The outputs of op amps 118, 114, 126 and 122 are all combined by adder 230 to provide an output signal T* which is a torque signal to be applied to the motor. This signal has both the magnitude of the torque to be applied, with the sign being either positive or negative to make the motor speed up or slow down accordingly.

Notice that there are two inputs to the controller, $\omega$motor and $\omega$drum, and one output from the controller, T*. $V_{in}$, the velocity reference voltage on line 100, is not considered an input, but rather can be considered internal to the controller.

The present invention has the advantage that after a load member such as an imaging member receives a torque spike, the settling time for the imaging member is substantially reduced resulting in fewer artifacts in the image as a result of increased relative damping/stiffness.

The invention has been described in detail with particular reference to a preferred embodiment thereof, but it will be understood that variations and modifications can be effected within the spirit and scope of the invention as described hereinabove and as defined in the appended claims.

I claim:

1. In a image-forming apparatus comprising a movable imaging member rotatable to bring the periphery of said imaging member past a series of electrographic stations, which include charging, exposing and toning stations to create a series of toner images, and a transfer station for transferring said images in registration to a receiving sheet to create a multi toned image, said apparatus including:
   a) a motor including encoder means for determining both velocity and position of said motor and further including means for providing a first signal incorporating said information;
   b) a drive belt for transferring power from said motor to said movable imaging member;
   c) encoder means mounted on said movable imaging member to determine both velocity and position of said imaging member and providing a second signal incorporating said information; and
   (d) controller means responsive to said first and second signals to provide a third signal to said motor to reduce to a minimum both the velocity and positional error signals between said imaging member and said motor.

2. In a recording system of the type in which an imaging surface of a moving image recording element is repeatedly scanned by an intensity-modulated light beam to record successive lines of image information on the imaging surface; the recorded image information is developed with pigmented particles to produce a transferable image; the transferable image is transferred to an image-receiving sheet while the image recording element is moving through an image transfer station to which the sheet is presented and pressed into engagement with the transferable image on the moving image recording element, a portion of such image transfer being effected while the imaging surface of the image-recording element is being scanned by said modulated light beam, said apparatus comprising:

means for minimizing variations in the spacing between successive lines of image information as a result of increased relative damping and relative stiffness between the imaging surface of the image recording element and the motor and means for transferring power from the motor to the image recording element.

3. In a recording system of the type in which an imaging surface of a moving image recording element is repeatedly scanned by an intensity-modulated light beam to record successive lines of image information on the imaging surface; the recorded image information is developed with pigmented particles to produce a transferable image; the transferable image is transferred to an image-receiving sheet while the image recording element is moving through an image transfer station to which the sheet is presented and pressed into engagement with the transferable image on the moving image recording element, a portion of such image transfer being effected while the imaging surface of the image-recording element is being scanned by said intensity modulated light beam, said apparatus comprising:

means for minimizing variations in the spacing between successive lines of image information as a result of increased relative stiffness between the imaging surface of the image recording element and the motor; and means for transferring power from the motor to the image recording element.

4. In a recording system of the type in which an imaging surface of a moving image recording element is repeatedly scanned by an intensity-modulated light beam to record successive lines of image information on the imaging surface; the recorded image information is developed with pigmented particles to produce a transferable image; the transferable image is transferred to an image-receiving sheet while the image recording element is moving through an image transfer station to which the sheet is presented and pressed into engagement with the transferable image on the moving image recording element, a portion of such image transfer being effected while the imaging surface of the image-recording element is being scanned by said intensity modulated light beam, said apparatus comprising:

means for minimizing variations in the spacing between successive lines of image information as a result of increased relative damping between the imaging surface of the image recording element and the motor; and means for transferring the power from the motor to the image recording element.

5. An apparatus for increasing both the relative damping and the relative stiffness between a rotating load member driven by a motor via a transmission, said apparatus comprising:

means for generating a velocity reference voltage signal representing the desired velocity of the motor;

means for generating a periodic motor signal representing the actual position of the motor;

means for generating a periodic load signal representing the actual position of the load member;

means for converting said periodic motor signal to a voltage signal representing the actual velocity of the motor;

means for converting said periodic load signal to a voltage signal representing the actual position of the load;

means for converting said velocity reference voltage signal to a periodic signal representing the desired position of the motor;

means for detecting the phase difference between the periodic signal representing the desired position of the motor and the periodic motor signal representing the actual position of the motor, said phase difference representing the first error signal between the actual position of the motor and the desired position of the motor;

means for combining said voltage signal representing the actual velocity of the load with the voltage signal representing the actual velocity of the motor wherein said combined signal is a second error signal representing the error between the velocity of the load and the velocity of the motor;

means for amplifying said second error signal;

means for combining said velocity reference voltage signal with the voltage signal representing the actual velocity of the motor wherein said combined signal is a third error signal representing the error between the velocity of the motor and the desired velocity of the motor;

means for amplifying said third error signal;

means for amplifying said first error signal;

means for integrating said first error signal;

means for amplifying said first integrated error signal; and means for combining said first integrated error signal with said first error signal and said second error signal and said third error signal to produce a torque signal for adjusting the velocity and position of said motor.

* * * * *